United States Patent [19]
Simmonds, Jr.

[11] 3,794,301
[45] Feb. 26, 1974

[54] METHOD AND APPARATUS FOR MIXING AND DISPENSING

[75] Inventor: Robert C. Simmonds, Jr., Topsfield, Mass.

[73] Assignee: USM Corporation, Boston, Mass.

[22] Filed: Oct. 13, 1972

[21] Appl. No.: 297,382

[52] U.S. Cl. .................................. 259/7, 23/252 R
[51] Int. Cl. ............................................. B28c 7/04
[58] Field of Search ........ 259/7, 8, 9, 10, 154, 148, 259/149, 164, 165, 161, 162; 222/70, 134, 135; 23/252 R

[56] References Cited
UNITED STATES PATENTS

| | | |
|---|---|---|
| 3,123,342 | 3/1964 | Little ..................................... 259/7 |
| 3,409,174 | 11/1968 | Radcliffe ............................... 222/70 |
| 3,448,967 | 6/1969 | Seanor ................................ 259/154 |
| 3,608,869 | 9/1971 | Woodle .................................. 259/7 |
| 3,632,022 | 1/1972 | Simmonds .......................... 222/134 |

Primary Examiner—Robert W. Jenkins
Attorney, Agent, or Firm—Vincent A. White; Richard B. Megley; Howard R. Berkenstock, Jr.

[57] ABSTRACT

Method and apparatus for the mixing and dispensing of a multiple component material composition wherein said component materials are supplied substantially continuously in controlled ratio in a substantially concurrent mixing and dispensing cycle, and said cycle is repeatable to form successive mixing and dispensing as required in processes such as mold filling.

16 Claims, 8 Drawing Figures

METHOD AND APPARATUS FOR MIXING AND DISPENSING

BACKGROUND OF THE INVENTION

The present invention relates to improvements in the method and apparatus for mixing and dispensing a multicomponent material wherein the basic liquid ingredients are charged into the apparatus according to a predetermined ratio, and concurrently with the charging, the mixed material is dispensed. In a preferred embodiment subsequently disclosed, the basic liquid ingredients, when combined, form a reactive mixture which still may be in a controlled reacting condition when dispensed from the mixer.

Prior art devices for mixing and dispensing utilized in applications analogous to the present invention generally have operated on a batch mixing principle. Illustrative of such devices and applications are: U.S. Pat. Nos. 3,409,174; 3,632,022; and 3,642,175; all assigned to the assignee of the present invention. These illustrative devices are generally for use in mixing and dispensing a polyurethane composition, and in the utilization of which the component ingredients including a polyhydroxyl composition and an isocyanate composition are sequentially fed to a mixing chamber in a desired ratio. These prior art devices also include means whereby the ratio at which the compositions are fed to the mixing chamber may be varied, and means whereby the total quantity of the constituent compositions fed to the mixing chamber may be varied (including means for accordingly varying the volume of the mixing chamber.)

One of the problems existing with the prior art, batch type devices has been their volumetric limitations. Specifically in applications of the mixing devices for supplying plastics molding equipment, the size of a molded part was limited by the technology limiting mixer volume. The reaction characteristics of mixed quantities of reacting component materials tended to vary when chamber volumes were increased beyond known sizes. Further, larger batches required longer times to fill the increased size mixing chambers as well as increased the specific times required for proper mixing of component ingredients. Such increased time factors interjected mixed material history variations which disrupted established injection history requirements.

The present development provides a method and apparatus for mixing and dispensing material wherein constituent ingredients are fed substantially contemporaneously, in a predetermined controllable ratio to a mixing chamber, and the mixed material may be dispensd from the chamber substantially contemporaneously with said mixing. The mthod and apparatus thus provide, in the preferred embodiments (but are not limited thereto), a controlled production rate reactor for such timed reactions as involved in the manufacture of a material such as polyurethane and permits the injection of the mixed material into molding apparatus with significantly greater control over mixing history without previously known volumetric limitations. While the illustrative embodiment shows two components being mixed and dispensed the method and apparatus are not to be considered so limited. Clearly any number of component ingredients may be accommodated, being combined in desired relative proportions.

SUMMARY OF THE INVENTION

This invention relates to method and apparatus for mixing and dispensing a multicomponent liquid mixture. In accordance with certain features of the invention there are provided method and apparatus for performing the operative steps of supplying a first component ingredient to a mixing chamber and metering same, supplying a second component ingredient to the mixing chamber, and metering same, substantially concurrently with the first ingredient, measuring the relative proportion of the component ingredients being supplied to the chamber, comparing the measured ratio to a predetermined standard ratio, controlling the metering of one of the component ingredients so as to maintain the ratio at the predetermined standard, mixing the ingredients supplied the chamber substantially concurrently with the supply thereto and dispensing the mixed ingredients from the chamber substantially concurrently with the continuing supplying of the ingredients to the chamber.

DESCRIPTION OF THE PREFERRED EMBODIMENT

Figure 1:
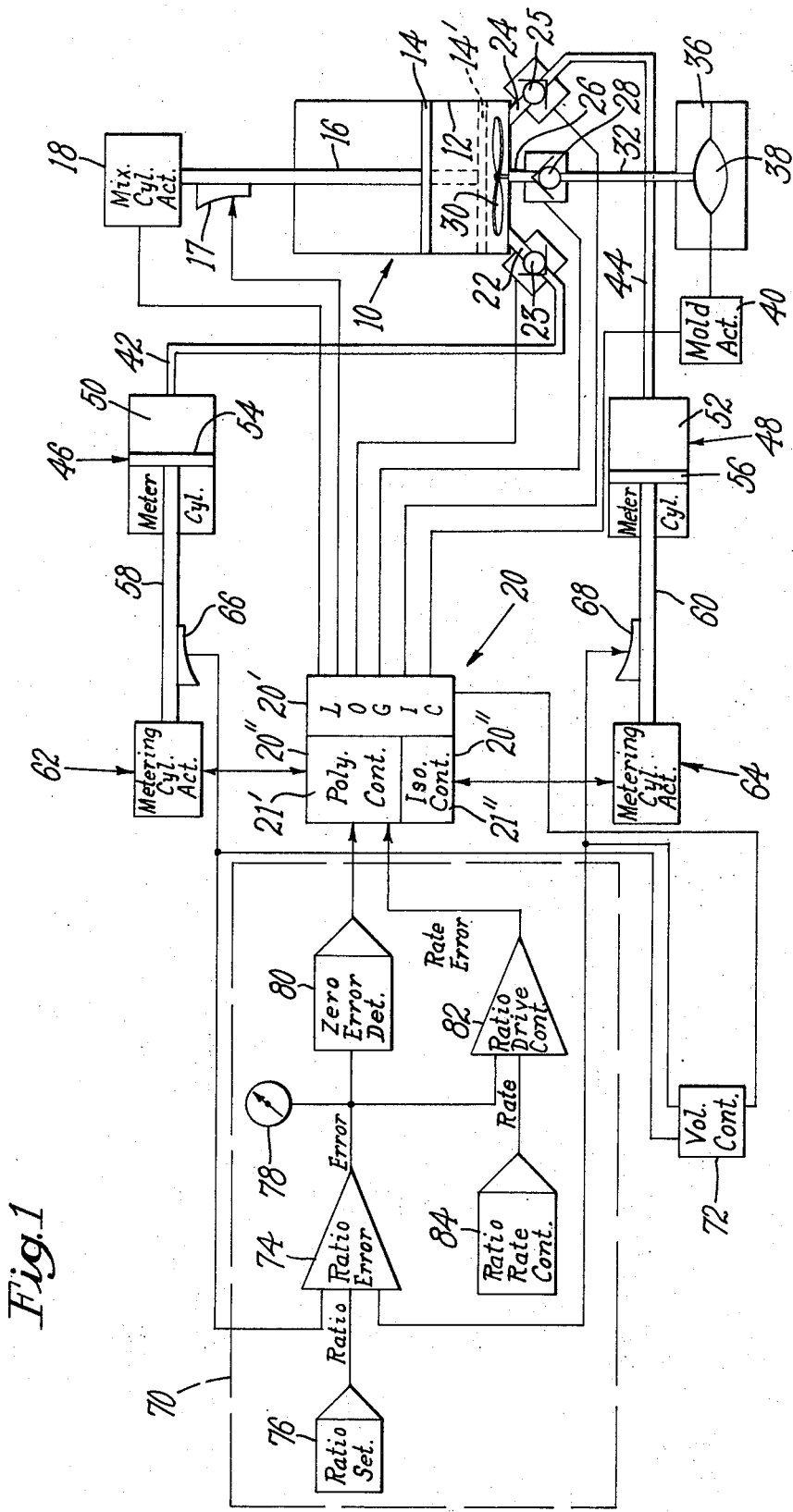
FIG. 1 illustrates in block diagram form typical apparatus for performing the novel mixing and dispensing of component materials forming a reactive mixture.

The illustrative apparatus is adapted for use in dispensing a multiple component material such as a polyurethane composition. Reference number 10 indicates a mixing chamber preferably having a variable volume. Chamber 10 includes cylinder 12 having a piston 14 slidably disposed therein and connected to a piston rod 16. Piston 14 while slidably disposed in cylinder 12 is closely received therein so as to prevent the undesired escape of materials being mixed therefrom.

Piston rod 16 is connected to actuator means 18 for driving piston 14, and controlling the volume of chamber 10. Position sensing means such as a position transducer 17 may be operably connected to piston 14 as by being driven by rod 16, to sense the position of piston 14 with cylinder 12. Actuator 18 may include hydraulic or electrical motor means for positioning rod 16 and piston 14. Actuator 18 as well as transducer 17 are operably connected to master control means 20, as indicated in block form. Master control 20 for the illustrative polyurethane mixing is divisable into three basic control functions as indicated; being mixer Logic section, a first component control section and a second polyisocyanate component control section.

Extending into cylinder 12 are first and second inlet ports, 22 and 24, respectively. Preferably, valving means 23 and 25 are disposed within ports 22,24 to sequence inflow or shut off of component material into mixing chamber 10. Extending centrally (preferably) of the end of mixing cylinder 12 opposite piston 16 is outlet port 26 controllable by outlet valve 28. Mounted in cylinder 12, generally adjacent inlet ports 22 and 24 and outlet port 26 is stirring means 30. Conveniently stirrer 30 may be a propeller like device for agitating the constituent components being supplied to cylinder 12 through ports 22 and 24. As illustrated, valves 23, 25 and 28 are operably connected to control 20 to be controlled thereby for proper sequencing of mixing and dispensing.

Outlet port 26 is connected through conduit means 32 to a receptacle 34 for the mixed product of chamber 10. In the illustrative embodiment, receptacle 34 includes mold means 36 having a molding cavity 38 therein. Apparatus illustrated in above mentioned U.S. Pats. Nos. 3,409,174 and 3,632,022 is illustrative of sequential, batch-type variable volume mixing chambers and associated hardware for the molding of polyurethane material.

Inlet ports 22 and 24 are connected through conduit means 42 and 44 respectively to first and second component metering means 46 and 48 respectively. It is to be understood that a variety of means such as continuous or intermittent pumps could be used to supply ingredients from bulk supplies as a means. However, for illustrative purposes metering means 46 and 48 may be cylinders 50 and 52 having metering pistons 54 and 56 closely received but slidably disposed therein. Metering pistons 54 and 56 may be motivated by rod means 58 and 60 through actuator means 62 and 64. In the illustrated embodiment, metering cylinder 50 may supply the polyhydroxyl component of the polyurethane compound to be formed in chamber 10 and cylinder 52 may supply the isocyanate component. Component metering means 46 and 48 include sensing means capable of generating a control signal directly related to metered component delivered to mixing chamber 10. In the instance of the illustrated metering cylinders 50 and 52, position transducers 66 and 68 on polyhydroxyl and isocyanate piston rods 58 and 60 respectively, supply an indication of piston 54, 56 location and thus, of the rate or volume component material supplied by each of the means 46,48.

Actuator means 62 and 64 may conveniently be hydraulically or electrically powered devices such as hydraulic or electrical motors (rotary or reciprocating), controllable through a master control means 20 as indicated in FIG. 1. A wide variety of control means are commercially available and known to those skilled in the art which may be selected and combined in accordance with the invention to provide the function subsequently described.

Master control means 20 may be functionally divided into logic section 20' which orders and controls the sequence of function of the illustrated mixing and dispensing apparatus, and metering control section 20". Metering control section 20" serves to direct the operation of metering means 46,48 through actuators 62,64. Thus section 20" is divided into first component (polyhydroxyl) control section 21' and second component (polyisocyanate) control section 21".

Master control 20 may be programmed for the illustrative apparatus mechanically, electrically and/or hydraulicly to cause the polyhydroxyl component and isocyanate component to be metered from cylinders 50,52 through conduits 42,44, valves 23,25, inlet ports 22,24 into mixing chamber 10. Ratio control means 70 functions to instruct control 20 of the preselected relative proportion of the component materials to be supplied and to maintain the proper ratio of components during the mixing and dispensing cycle. The elements and function of means 70 to perform this proportioning will be described in detail subsequently.

In the typical operating cycle, mixing chamber 10 may supply mold 34 with a shot of polyurethane forming material, then rest until a subsequent molding operation is ready to be performed. During such rest period, the filled mold might be opened, emptied and prepared for a subsequent shot immediately or, the molding machine might be equipped with a plurality of mold stations, and a prepared station cycled into operative engagement with the mixing chamber. U.S. Pat. No. 3,632,022 is illustrative of such apparatus. It is also possible to use the apparatus in an extended operating cycle such as for the extrusion of a mixed material.

Figure 2:
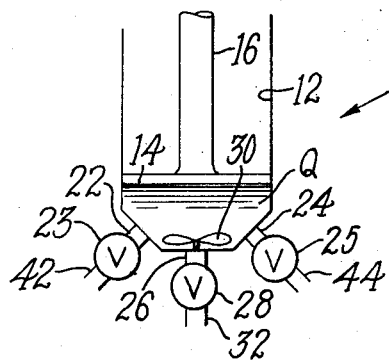
FIGS. 2–8 illustrate the operative sequence of an embodiment of the disclosed novel method and apparatus.

During the sequential operation of chamber 10 to fill subsequent molds with a polyurethane forming composition the chamber starts from a "rest" condition. In normal operating sequence, chamber 10 in the rest condition contains a residuum of material — being the remnants (subsequently described) of a previous mixing cycle. This condition is illustrated in FIG. 2, showing the chamber 10, valves 23, 25 and 28 in the closed condition and the piston 14 in a position providing a volume to accommodate the residuum of material Q. In the illustrated apparatus this residuum Q may be rich in polyhydroxyl component ingredient.

Figure 3:
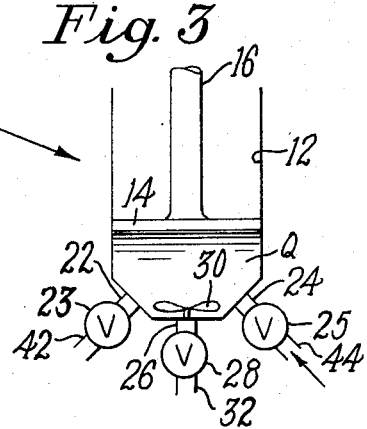

When a mold 34 is ready for a shot, actuator 40 signals control 20 of the mold's readiness. Control 20 then opens valve 25 and actuates metering means 48 through control 21" and actuator 64 to supply a quantity of isocyanate component ingredient through conduit 44 and port 24 to cylinder 12. This component is supplied in a quantity calculated to bring the polyhydroxyl rich residuum back to the relative proportion for controlled reaction. This sequence is illustrated in FIG. 3. Concurrent with the addition of polyisocyanate component ingredient, control 20 enables chamber 10 to increase its volume by raising piston 14, as by signaling actuator 18 and moving rod 16 or by allowing the incoming material to force piston 14 upward. Transducer 17 signals the travel of piston rod 16 and control 20 interrupts the actuation of actuators 18 and 64 when the mixture in cylinder 12 is returned to a properly proportioned mixture.

Figure 4:
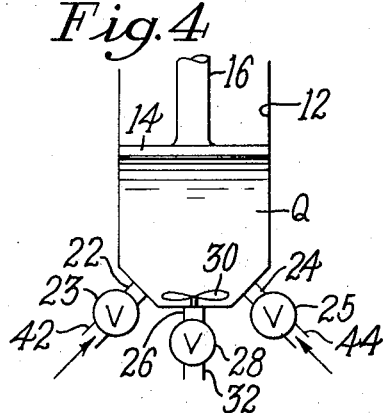

Control 20 then actuates ratio control means 70 which signals concurrent supply of component ingredients to chamber 10. Control means 21' and 21" initiate the metering of components from means 46,48 through conduits 42,44 and ports 22 and 24 respectively. Control 20 has concurrently opened valves 23 and 25 (25 may already be open from the previous step) and coordinately increases the value of chamber 10 accommodate the increasing volume of the mix (output valve 28 remaining closed). This event is illustrated at FIG. 4. Ratio control means 70, from the moment of actuation by control 20 receives the quantity information of component ingredients metered as measured by transducers 66,68 and computes ratio information which is supplied to controls 21, 21". These controls cause the metering means 46,48 to bring the mixture "on ratio" (if not at the preselected value) and supplies a signal to control 20 when this condition is reached (zero error indication). In practice, the mixture may be brought "on ratio" by return of polyisocyanate in the previous step and no additional metering in this step may be necessary.

Figure 5:
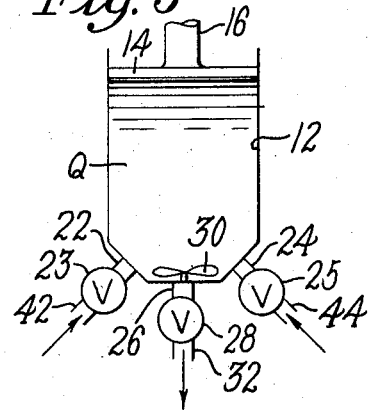
Figure 6:
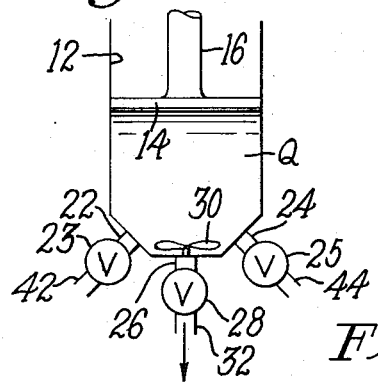

Once control 20 receives the "on ratio" or zero error indication, the mixture in chamber 10 is ready to begin being dispensed into mold cavity 38. FIG. 5 illustrates this event in the mixing and dispensing sequence of the present invention. Valve 28 is opened by control 20 and the reacting, polyurethane forming mixture is injected into cavity 38. Metering means 46,48 continue to supply component ingredients, at proper ratio as controlled by means 70, through control 20' and actuators 62,64. Control 20 adjusts the volume of cylinder 12 to an optimum mixing volume for the concurrent mixing and dispensing of material Q. (FIG. 6)

Volume control means 72 monitors the amount of component materials supplied to cylinder 12 in the illustrated embodiment by observing the movement of pistons 54,56 (by rods 58,60 and transducers 66,68). The computed total quantity of component ingredients supplied is compared to a preselected total quantity (shot size) and when this value is reached, the master control 20 observes the event. Master control 20 may then signal shutoff of component materials (as by closing valves 23,25 and terminating the metering of components by means 46,48).

Figure 7:
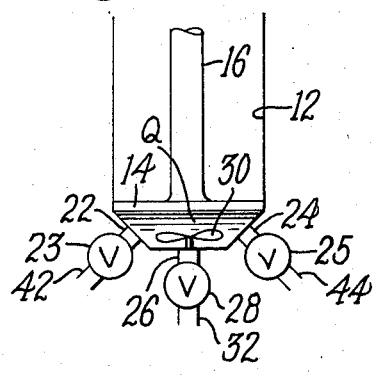

In the preferred embodiment, control 20 anticipates the completion of the supply of material to mold cavity 38 approaching the conclusion of the dispensing cycle. Control means causes the volume of material still remaining within cylinder 12 to be reduced to a predetermined nominal level, insofar as is practical, to evacuate the cylinder 12 of the reacting, mixing polyurethane forming components. Control 20, through actuator 18 causes the advance of piston 14 toward outlet port 26. Once piston 14 has "bottomed out" (reached the predetermined advanced position indicated by dotted lines 14') the dispensing or injection into mold 36 is complete. Valve 28 is ordered closed. This condition is illustrated in FIG. 7.

Figure 8:
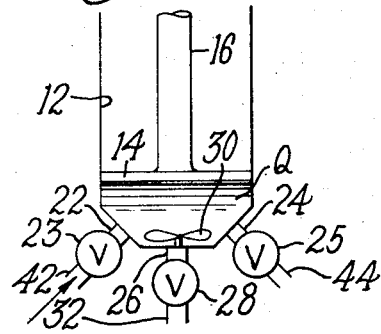

Since there is a residuum of reacting polyurethane forming material remaining within chamber 10, control 20 is programmed to dilute the residuum mixture to quench the polyurethane forming reaction. In the illustrated embodiment, at the completion of injection, a predetermined quantity of polyhydroxyl component is supplied by metering means 46 through opened valve 23 and port 22. Concurrently control 20 increases the volume of cylinder 12 to accommodate the dilution of the residuum. See FIG. 8.

It should be noted that the above disclosed method of mixing and dispensing and the apparatus therefor describe a sequence of function not previously performed in the related mixing and dispensing arts. It is to be further appreciated that the disclosed concurrent filling of the mixing chamber and dispensing of mixed material is volume limited only the size of the component metering means (46,48). Previous batch-type mixing/dispensing systems have been limited by the volume of the mixing chamber, and/or the prior practice of sequentially filling the mixing chamber with the components of the reacting mixture.

Further contributing to the success of the present method and apparatus for mixing is the method and apparatus for controlling the ratio of component materials achieved by ratio control means 70. Ratio control 70 is conveniently illustrated in elemental electrical block diagram form, however it should be understood that known fluidic or mechanical equivalents of the combined elements could be used.

Transducing means 66 and 68 provide quantitative information of the metered components supplied by means 46,48 to mixing chamber 10, being conveniently a voltage signal proportional to each of the quantities of material supplied. These signals are supplied to summing means 74 which in turn, generates an error signal proportional to the difference of the quantitative signals. In the illustrated embodiment, summing means is illustrated as including a ratio signal input 76 by which one of the other incoming quantitative signals may be modified with the information as to preferred relative proportion of ingredients. Thus the output of means 74 may reflect the error from the desired ratio valve. Ratio signal input 76 could be rendered unnecessary in those situations where metering means 46,48 had a geometrical relationship which provided the desired ratio in their basic function (as by causing cylinders 50,52 to be of comparative diameters equal to the desired ratio).

The output signal of means 74 (ratio error) is conveniently supplied to indicator means 78, a "zero" error detector 80 and a ratio drive control 82. Zero error detector 80 monitors the error signal output from means 74 and provides an output "on ratio" signal to the master control 20 when the ratio error is within the "zero" limits of detector 82. Master control 20, upon receipt of "on ratio" information may appropriately signal concurrent mixing and dispensing of the reacting polyurethane forming mixture.

The significance of "on ratio" signaling may be appreciated by further reference to the previously described "dilute" shot which quenches the reaction in the residuum of material at the end of a mixing/molding cycle. For, until the polyhydroxyl component rich charge within chamber 10 at the beginning of a subsequent cycle is brought up to the desired ratio, a mold-ready mixture is not available in chamber 10 for injection (dispensing through outlet 28). Thus, in the polyhydroxyl rich stage, at the beginning of a cycle, master control 20 disenables the actuation of further polyhydroxyl metering, until the polyisocyanate component level in chamber reaches the "on ratio" value. At this time in the cycle, the first component metering means 46 may be actuated to follow the ratio.

In the preferred embodiment illustrated the selected ratio drive 82 provides a particularly accurate means of control of ratio of the component ingredients. A ratio rate signal is generated in generator means 84. This rate signal, if provided to metering means actuator 62 would tend to drive metering means 46 at a proper rate (as compared to independently driven means 48) for maintaining component ingredients on ratio, if initially there were no other system upsets to disturb the individual metering feed rates. However, ratio drive control 82 receives the ratio rate signal from means 84 as a "bias" signal ad the "error" signal from the means 74. Ratio drive control 82 then produces a modified drive signal reflecting the required ratio error correction which may then be directly supplied to metering actuator 62 (such as through control 21" for proper overall control coordination). Small errors in ratio may be detected and corrections superimposed upon the drive rate signal supplied from means 84. Thus, the signal which is alternately supplied to actuator 62 to correct ratio, may be the sum of inputs to drive control 82, and of high accuracy when compared to a system which would generate an analogy drive rate signal based on error observation.

The method and apparatus of the present invention have been here disclosed in basic form, as particularly adapted to the molding of polyurethane compound formed from polyhydroxyl and polyisocyanate component ingredients. Other fields of application of the instant method and apparatus, or modification thereof are in the application of coatings for sealing, adhering, protecting or decorating applications, the manufacture of laminations, or thermosetting extrusions, or the like. It then will be apparent that many variations may be made in the disclosed method and apparatus to accommodate a particular need without from the spirit and scope of the invention as defined in the following claims.

Having thus described my invention, what I claim as new and desire to secure by Letters Patent of the United States is:

1. A method of mixing and dispensing a multicomponent material wherein the component ingredients are supplied in measured relative proportions to a mixing chamber, comprising the steps of: metering a first component ingredient to said mixing chamber; metering a second component ingredient to said mixing chamber, substantially concurrently with said first ingredient; measuring the relative proportion of said ingredients being supplied to said chamber; comparing said relative proportions of said components to a predetermined standard; controlling said metering of a component ingredient so as to maintain said relative proportions at said predetermined standard; mixing said ingredients substantially concurrently with the metering of said ingredients to said mixing chamber; dispensing said mixed ingredients from said chamber substantially concurrently with said metering said component ingredients while said relative proportion is at said predetermined standard.

2. A method according to claim 1 wherein said mixed materials are reaction producing and are intermittently dispensed in measured quantity to a receptacle such as a mold wherein the operative mixing and dispensing steps include diluting said relative proportion of the residuum said constituent ingredients in said mixing chamber subsequent to the dispensing of said measured quantity to said receptacle with a predetermined quantity of an ingredient, thereby quenching the reaction of said mixed materials in said chamber by substantially changing the relative proportion of said component ingredients.

3. A method according to claim 2 wherein said mixing chamber contains the ingredients of said quenched reaction and including the step of returning said quenched reaction to the predetermined relative proportion of reactive ingredients by supplying a predetermined quantity of the other of said component ingredients of said reaction producing mixture, prior to said supplying of component ingredients for concurrent mixing and dispensing.

4. A method according to claim 3 including the step of decreasing the volume of said mixing chamber to a predetermined minimum value immediately prior to completion of filling said receptacle and subsequently increasing said mixing chamber volume subsequent to said dispensing and concurrently with said supplying of said diluting component ingredient.

5. A method according to claim 3 including the step of increasing the volume of said mixing chamber concurrently with the metering of said other component ingredients during the reestablishing of said predetermined component ingredient relative proportions and reacting thereof.

6. A method according to claim 1 including the steps of varying the volume of said mixing chamber being supplied with said metered component ingredients by increasing said chamber volume during the steps of measuring, and comparing said relative proportions and controlling said metered rate to obtain said predetermined standard.

7. A method according to claim 6 including the step of varying the volume of said mixing chamber to a predetermined volume concurrently with said dispensing whereby said chamber volume, during the mixing and dispensing step will be at a volume wherein optimum mixing may be achieved.

8. Apparatus for dispensing a multicomponent composition provided by the mixing together of at least two component ingredients comprising: a mixing chamber; means for supplying a first component ingredient to said chamber; means for supplying a second component ingredient to said chamber; means for metering the first component supplied said chamber; means for metering the second component supplied said chamber; means for comparing the measurements of said first and second metering means; means for controlling at least one of said supply means to cause said proportions of said measured supply to meet a predetermined standard; means for dispensing said composition; means responsive to said comparison means to cause said composition to be dispensed when said predetermined standard is met.

9. Apparatus according to claim 8 including means for varying the volume of said mixing chamber and means controlling said varying means to cause said chamber volume to correspond to the volume of components added to said chamber.

10. Apparatus according to claim 9 wherein said means controlling said chamber volume is responsive to said comparison means to cause said volume to vary to a predetermined mixing standard during said dispensing of said composition.

11. Apparatus according to claim 9 including means to control said supply means to dispense a predetermined quantity of multicomponent composition.

12. Apparatus according to claim 11 wherein said means to control said chamber volume is responsive to said means to control said quantity of composition to cause said chamber volume to reach a predetermined minimum volume when said predetermined quantity of composition has been dispensed.

13. Apparatus according to claim 8 including means to inactivate said dispensing means, means to inactivate said means controlling one of said supply means to cause said comparison means to meet a predetermined standard; and means to supply a predetermined quantity of one of said ingredients to said mixing chamber subsequent to inactivation of said above named means, whereby at the end of dispensing, the composition remaining in said chamber is diluted with one of said component ingredients.

14. Apparatus according to claim 13 adapted to restore said diluted composition remaining in said chamber to a ratio of components to meet predetermined standard prior to further mixing and dispensing including means to inactivate the supply means of said dilute component, means to supply a predetermined quantity of the other of said component ingredients to said chamber to cause said proportions of said measured supply to said chamber to meet said predetermined standard and means to reactivate said inactivated supply and comparison means.

15. Apparatus according to claim 8 wherein said means for metering said first component ingredient includes means for generating a signal directly proportional to said first metered supply; said means for metering said second component ingredient includes means for generating a signal directly proportional to said second metered supply; said means for comparing said measurements of said metering means include means for comparing said signals and generating a signal directly proportional to the difference of said first and second supply signals; said means for supplying said first component ingredient to said chamber includes means for supplying said component at a predetermined rate; said means for controlling at least one of said supply means to cause said proportions of said measured supply to meet a predetermined standard include said control means adapted to be responsive to a driving signal being the sum of said signal proportional to the difference of said first and second supply signals and a signal directly proportional to a constant value which would otherwise cause said controllable supply to be metered at a rate predetermined to meet said predetermined standard.

16. A method of mixing and dispensing successive shots of a multi-component material wherein the component ingredients are supplied in measured relative proportions to a mixing chamber comprising: a first stage of substantially continuously metering a first component ingredient to said mixing chamber; substantially continuously metering a second component ingredient to said mixing chamber in predetermined relative proportion to said first component ingredient; mixing said component ingredients substantially concurrently with the metering of said ingredients to said mixing chamber, dispensing said mixing ingredients from said chamber substantially concurrently with said metering of said component ingredients while said relative proportion is at said predetermined proportion; a second stage of substantially concurrently cutting off entry of said first and second component ingredients and reducing the volume of said chamber to expel a major portion of said mixed ingredients from said chamber; a third stage of cutting off discharge of mixed ingredients from said chamber; metering a predetermined amount of one of said component ingredients into said chamber and mixing it with mixed components remaining in said chamber to dilute the relative proportion of the other ingredient in the mixture in said mixing chamber and concurrently increasing the volume of said mixing chamber to accept said amount of said one component; and a fourth stage of metering and mixing a quantity of said other component ingredient to bring the relative proportion of said first and second component ingredients in the mixture in said chamber to said predetermined standard and concurrently increasing the volume of said mixing chamber to accept said quantity of said other component ingredient prior to repeating the stages of the process.

* * * * *